Aug. 7, 1962 H. V. JOHNSON ET AL 3,048,434
ELECTRODE JOINT
Filed July 27, 1959 2 Sheets-Sheet 1

INVENTORS
HARRY V. JOHNSON
FRED P. KIRKHART
BY John F. Hohmann
ATTORNEY

Aug. 7, 1962     H. V. JOHNSON ET AL     3,048,434
ELECTRODE JOINT

Filed July 27, 1959     2 Sheets-Sheet 2

INVENTORS
HARRY V. JOHNSON
FRED P. KIRKHART
BY John F. Hohmann
ATTORNEY

United States Patent Office 3,048,434
Patented Aug. 7, 1962

3,048,434
ELECTRODE JOINT
Harry V. Johnson, Niagara Falls, and Fred P. Kirkhart, Sanborn, N.Y., assignors to Union Carbide Corporation, a corporation of New York
Filed July 27, 1959, Ser. No. 829,762
7 Claims. (Cl. 287—127)

This invention relates to carbon electrode joints and it more particularly relates to such electrode joints having improved conductivity.

The term carbon as used hereinafter is meant to encompass both graphite and non-graphitic or amorphous carbon.

One of the major problems facing the electrometallurgy industry resides in the fact that electrode joints sometimes have a tendency to rupture during use. This breakage may be caused by mechanical stress set up through vibration or other causes, but more often such rupture is caused by a thermal gradient set up between the nipple and the electrode sections joined thereby and within the electrode walls. It is known that modern day manufacturing techniques are limited by economic factors as to the tolerances maintained between the nipple and the electrode sections. Because of the relatively wide tolerances prevailing, there is no total carbon to carbon face and point contact. In fact, it has been determined that only about 40% of the nipple's cylindrical surface is in contact with the corresponding portions of the electrode sections and only about 50% of each electrode section face contacts the face of the corresponding electrode section. As evidenced by the fact that physical contact is made at only such a small portion of the available surface, spaces occur between the nipple and the electrode sections. These spaces represent regions of zero conductivity if left open, or very poor conductivity if filled with carbonaceous pastes or cements. The fact that there are such low conductivity regions between the electrode sections and the nipple provides the means whereby a temperature differential is set up across the cross-section of the joint. Since it is known that materials expand proportionately with temperature, the nipple and the electrode sections expand differing amounts and correspondingly thermal stress is built up thus sometimes causing cracks, splits and even rupture of the joint.

In addition to the thermal insulation provided by the spaces above referred to, the air therein is also an excellent electric insulator thus causing a higher resistance at the joint than is present at other points along the electrode length. This increased resistance in addition to adding to the thermal differential problem, is also wasteful of the electric power input, consuming such in heat which is not profitably utilized in the electrometallurgical process being performed.

It has been sought to remedy this situation by coating the screw threads of the nipple with a metal. By doing this, conductivity would be increased since the metal is usually more conductive than the carbon on which it is coated and because a larger surface area of contact is available with the metal coating. It should be noted, however, that the metal coating will melt away from the screw threads upon the application of heat normally associated with electrometallurgical processes, thus leaving a loose joint with considerable clearance between the parts thereof. If carbon to carbon contact is first obtained and maintained, the joint will stay tight and the addition of molten metal will then fill the voids normally associated with this type of joint. While the improved conductivity available at low temperatures by metal coating the screw threads is a valuable asset, it would be advantageous in the metallurgical industries to still further increase the conductivity, both thermal and electrical, of electrode joints over and above that available in conventional designs and even over that available by the above-noted proposed improvement.

It is, therefore, the primary object of this invention to prevent splitting and rupture of carbon electrode joints. It is another object of this invention to improve the conductivity of such joints.

These objects are attained by this invention which comprises a conventional electrode joint having physical contact between the nipple and both electrode sections as well as between the electrode sections themselves and sufficient conductive metal within said electrode joint to fill at least a portion of the spaces which are present therein. It is desirable to maintain the metal in the spaces in the molten state since minimum resistance is thereby obtained. However, a decrease in resistance is accomplished even where the spaces are filled with metal which has solidified.

This invention will be best understood with reference to the accompanying drawings in which.

Figure 1:
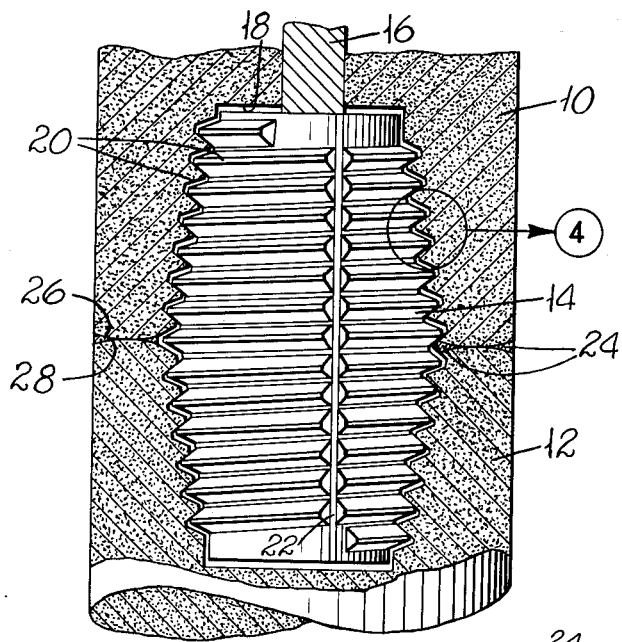
FIG. 1 is a vertical section of an electrode joint made according to this invention.
Figure 2:
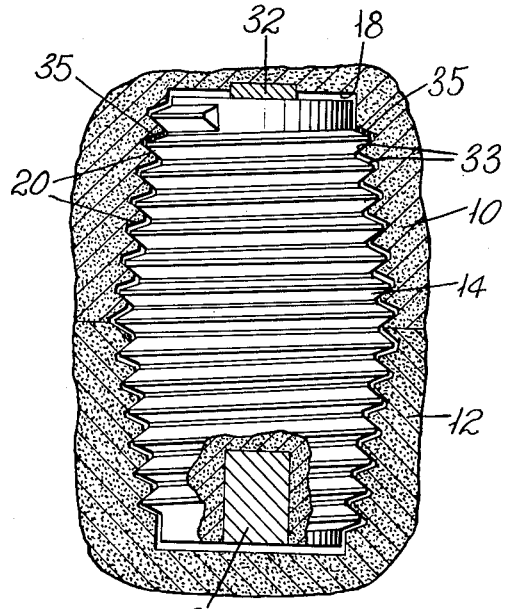
FIG. 2 is similar to FIG. 1 showing one modification thereof.
Figure 3:
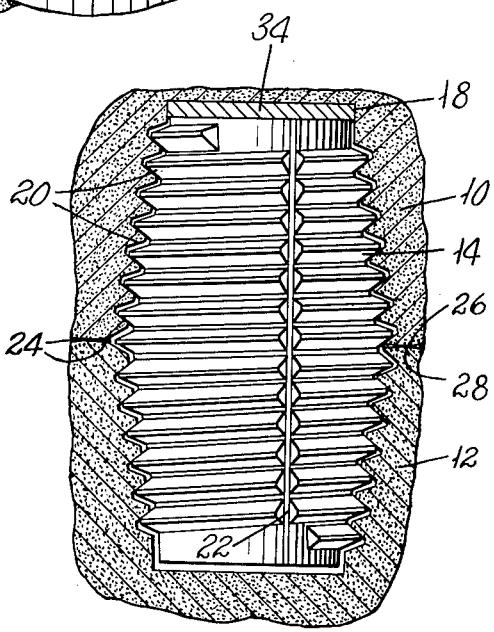
FIG. 3 is similar to FIG. 1 showing another modification thereof.

The conventional joint, intended to be improved by the use of the invention herein described and as shown in FIGS. 1, 2 and 3 comprises an upper electrode section 10, a lower electrode section 12, and a nipple 14 therebetween. The invention may best be carried out as shown in FIG. 1 by inserting a plug 16 of solid metal, of approximately the same volume as the spaces in the joint, into the base of the upper electrode socket 18. The screw threads 20 of either the nipple 14 or both the electrode sections 10 and 12 may conveniently be notched, such as shown for example at 22, in order to provide a conduit for the metal when it melts to fill all the joint spaces. It is important in carrying out this invention that a liquid-tight seal 24 be made between the electrode section faces 26 and 28 in order to insure that the liquid metal will not run out of the joint at this point.

Should it be desired to have only the ends of the nipple 14 in better contact with the electrode sections 10 and 12 that it joins, the construction shown in FIG. 2 would be best suited. In this modification, a plug 30 of metal to be melted may be placed into the base of the nipple 14 and a small plug of metal 32 may be placed in the base of the upper electrode socket 18. It is important here that either the first or second screw threads 33 on the upper side of the nipple 14 must be sealed such as shown at 35 to the corresponding electrode socket thread in order to keep the metal, after melting, from falling to the lower end of the joint.

Another modification of this invention as shown in FIG. 3 utilizes a disk of metal 34 between the upper end of the nipple 14 and the upper electrode socket base 18. This type of arrangement provides metal for imparting increased conductivity to the nipple face through the screw threads and between the base of the lower electrode socket and the lower end of the nipple. Although a space would be left between the nipple and the base of the upper electrode socket where there would be no physical contact available, the metal disk 34, upon melting, would run down and substantially fill the space between the nipple 14 and electrode section threads and between the nipple and the base of the lower electrode socket. This is the most important area where improved conductivity is needed and the space left near the upper electrode section socket 18 is therefore tolerated. In this modification, similar to that shown in FIG. 1, the electrode end faces 26 and 28 have to be sealed as at 24 to retain the molten metal within the joint. It is desirable, in the modification shown in FIG. 3 that the screw threads 20 of either the nipple 14 or both the electrode sections 10 and 12 be notched 22 similarly to that shown in FIG. 1 for the same purpose.

Figure 4:
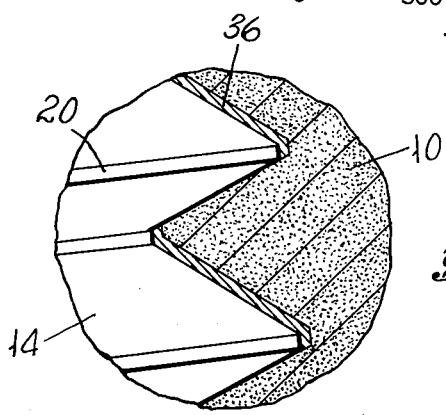
FIG. 4 is an enlargement of the section 4 in FIG. 1.

It may be seen, with reference to FIG. 4, that the metal 36 introduced into the electrode joint fills all the available space between the nipple threads 14 and the electrode sections 10 or 12. This is the situation regardless which mode of operation, as represented by FIGS. 1, 2 or 3, is chosen to introduce the metal into the joint.

It is obvious with each joint using a molten metal as a conductivity aid that if the electrode is consumable, as they usually are in electrometallurgical processes, when the electrode is consumed up to the joint, the molten metal will be added to the material in production. It is advisable wherever possible to use a metal in the joint which is compatible with or at least not objectionable to the product of the metallurgical process. Thus, for example, iron may be used in the joint when making ferromanganese or ferrosilicon alloys.

Where carbon, and especially coal, electrodes are in use, it is well to use a carbonaceous sealant in joining the electrode section faces or the screw threads as above noted. While it certainly is possible within the scope of this invention to use adhesives other than carbon base products, such might be added to the process as impurities if they are not consumed with the joint. It is therefore preferable to use carbon which is consumed along with the rest of the electrode.

As a specific example of this invention, 14 inch diameter coal electrode sections were joined by means of a 7 by 14 inch round threaded graphite nipple having an iron disk on the nipple in the upper part of the joint. The end faces of the electrode sections were sealed with a cement comprising fine granulated carbon and glucose and a first current of 11,250 amperes was passed through the joint thereby resulting in a 1.19 voltage drop across the joint which brought the temperature up to 406° C. A second current of 17,600 amperes at 0.90 volt was then passed through the joint and a resistance of $1.06 \times 10^{-4}$ ohms was observed at 406° C. This resistance reduced to $5.1 \times 10^{-5}$ ohms at 1264° C. showing that when the metal melted, the resistance of the joint was decreased. In a later test, of the same joint, which was conducted by allowing the molten metal to solidify in the joint and subsequently reheating it starting from room temperature, a resistance of $1.04 \times 10^{-4}$ ohms was measured at 888° C. This resistance decreased to $5.6 \times 10^{-5}$ ohms when the joint was heated to 1500° C. After this data was taken, the joint was cooled to below the melting point of the iron and sawed open. Upon examination of the joint, it was found that the metal solidified in substantially all the space within the joint. No leakage had occurred during these tests nor did the joints shown any signs of splitting or rupturing.

Table I belows shows the quantity of iron necessary to fill three different size joints which are herein set forth as examples of the size electrodes to which this invention is applicable. In determining these data, standard Acme type screw threads on a straight side coal nipple and corresponding electrode socket were used. The joints were filled with a slight excess of cast iron as the conductive metal.

Table I

| Electrode Size | Nipple Size | Weight, lbs. | Volume, in.³ |
|---|---|---|---|
| 40 x 110 | 21 x 40 | 230 | 888 |
| 35 x 110 | 18½ x 35 | 171 | 657 |
| 14 x 72 | 7⅓ x 11 | 12½ | 50 |

It is to be understood that these are examples only. This invention is in no way limited to these or any other particular electrode or nipple sizes nor is it limited to any particular metal. It is to be noted that this invention is applicable to amorphous carbon or graphite electrodes. It is essential, however, in the practice of this invention that the metal selected to fill the spaces within the electrode joint must be more conductive than carbon and it is also desirable, though not essential, that the specific gravity or density of the metal used decrease with temperature. In this way the filling of substantially all the spaces is insured.

Figure 5:
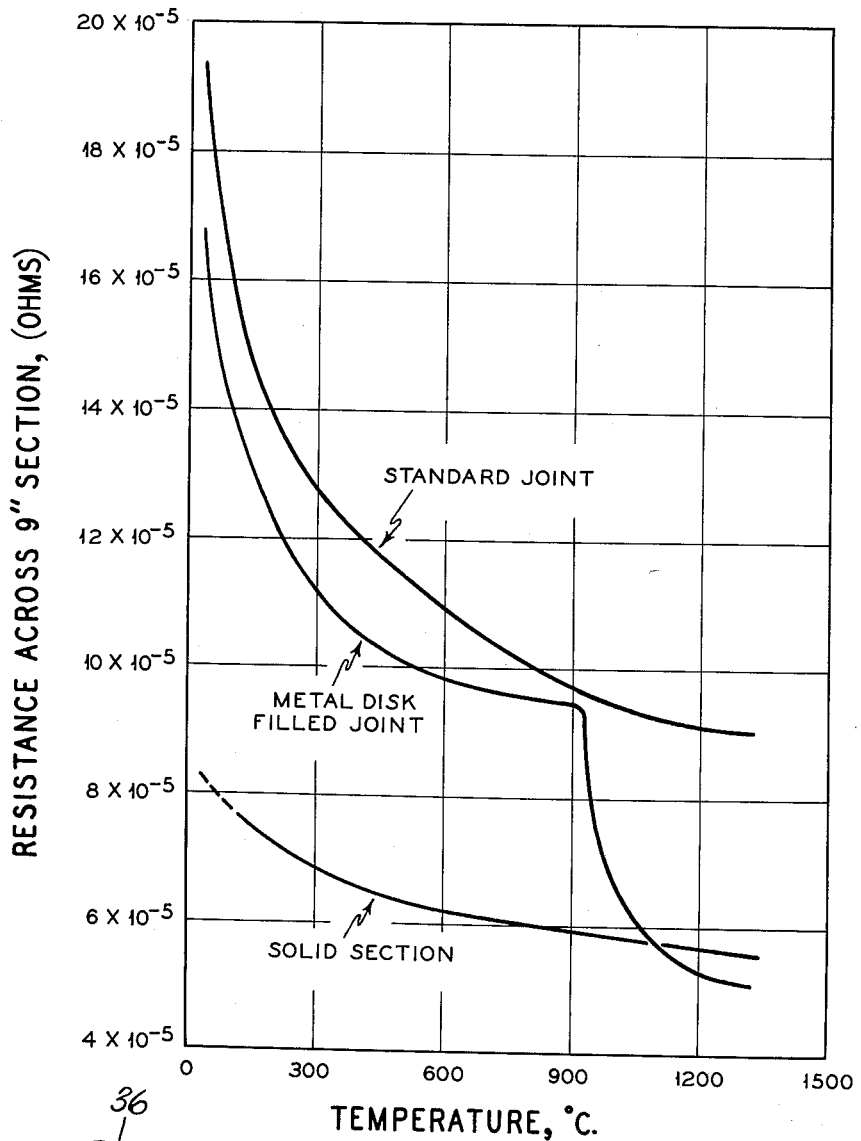
FIG. 5 is a series of curves comparing the resistance of various joints at different temperatures with and without the aid of molten metal therein according to this invention.

FIG. 5 shows a set of curves indicating a comparison of the resistance of the joint of this invention with a solid section and a standard joint. The temperature data for this figure is that measured on the electrode surface slightly below the socket. However, the nipple temperature was about 200° C. to 300° C. higher. The data there presented indicates that up to about 900° C. the surface temperature corresponding to melting point of the particular metal, iron, used in the invented joint tested, the metal disk joint had a slightly lower resistance than did a comparable standard or conventional joint. After the melting point of the metal has been reached, the curves show that the resistance of the metal filled joint decreases very rapidly with temperature while the resistance of the conventional joint continued its standard reducing trend. Thus, at 1200° C., the conventional joint has a resistance of about $9 \times 10^{-5}$ ohms while the metal filled joint has a resistance of about $5.2 \times 10^{-5}$ ohms. The invented metal filled joint even has a lower resistance than a solid carbonaceous section if the temperature is high enough, over about 1100° C. Of course, since the metal used to fill the section tested to provide the data for this figure was iron, the temperatures and resistances noted will vary if other more or less conductive metals are used.

What is claimed is:

1. A carbon electrode joint comprising an upper electrode section, a lower electrode section, a nipple therebetween, and conductive molten metal in substantially all of the available space between said nipple and said electrode sections, said nipple and said electrode sections all being in physical contact with each other.

2. A carbon electrode joint comprising an upper electrode section, a lower electrode section, a nipple therebetween, a sealant between at least a portion of the end faces of said electrode sections, and conductive molten metal filling substantially all the space between said nipple and said electrode sections.

3. A carbon electrode joint comprising an upper electrode section, a lower electrode section, a threaded nipple therebetween, a sealant between said upper electrode section and a thread near the end of said nipple, conductive molten metal between said nipple and said lower electrode section, and conductive molten metal above said sealant between said upper electrode section and said nipple.

4. The method of improving the conductivity of a carbon electrode joint, comprising an upper electrode section, a lower electrode section, and a nipple therebetween wherein there is physical contact between said nipple and said electrode sections and between each of said electrode sections; which comprises placing conductive metal in the space present in said joint between said nipple and said electrode sections and melting such metal thereby filling substantially all of said spaces and improving the conductivity of such joint.

5. The method of improving the conductivity of a carbon electrode joint, comprising an upper electrode section, a lower electrode section, and a nipple therebetween wherein there is physical contact between said nipple and said electrode sections and between each of said electrode sections; which comprises leakproofedly sealing the end faces of said electrode sections and filling substantially all the space between said nipple and said electrode sections with conductive molten metal.

6. The method of improving the conductivity of a carbon electrode joint, comprising an upper electrode section, a lower electrode section, and a threaded nipple therebetween wherein there is physical contact between said nipple and said electrode sections and between each of said electrode sections; which comprises leakproofedly sealing said upper electrode section to a thread of said nipple near the top thereof, filling the space above said thread between said nipple and said upper electrode section with molten conductive metal, and filling at least a portion of the space between said nipple and said lower electrode section with molten conductive metal.

7. The method of filling substantially all the space between a nipple and electrode sections of an electrode joint with molten metal which comprises placing a plug of metal to be melted in the base of the socket of the upper electrode, fitting the nipple therein, joining the lower electrode section thereto, sealing the end faces of said electrode sections, and heating said joint to a temperature at least as high as the melting point of said metal.

References Cited in the file of this patent

UNITED STATES PATENTS

| | | |
|---|---|---|
| 1,097,227 | Hinckley | May 19, 1914 |
| 1,743,888 | Hamister | Jan. 14, 1930 |
| 2,093,390 | Wyckoff | Sept. 14, 1937 |
| 2,836,806 | Stroup | May 27, 1958 |

FOREIGN PATENTS

| | | |
|---|---|---|
| 271,541 | Germany | Mar. 14, 1914 |
| 472,856 | France | Aug. 21, 1914 |